(12) United States Patent
Kotlaba et al.

(10) Patent No.: US 12,459,452 B2
(45) Date of Patent: *Nov. 4, 2025

(54) ADAPTIVE CONTROL SYSTEM FOR AUTONOMOUS CONTROL OF POWERED EARTH-MOVING VEHICLES

(71) Applicant: AIM Intelligent Machines, Inc., Monroe, WA (US)

(72) Inventors: Robert Kotlaba, Most (CZ); Jonathan D. Hurwitz, Seattle, WA (US)

(73) Assignee: AIM Intelligent Machines, Inc., Redmond, WA (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/439,557

(22) Filed: Feb. 12, 2024

(65) Prior Publication Data

US 2024/0409045 A1 Dec. 12, 2024

Related U.S. Application Data

(63) Continuation of application No. PCT/US2023/037209, filed on Nov. 13, 2023, and a
(Continued)

(51) Int. Cl.
*B60R 16/023* (2006.01)
*B60R 16/027* (2006.01)
*B60W 50/00* (2006.01)

(52) U.S. Cl.
CPC ........ *B60R 16/0231* (2013.01); *B60R 16/027* (2013.01); *B60W 2050/0014* (2013.01); *B60W 2300/17* (2013.01)

(58) Field of Classification Search
CPC ............ B60R 16/0231; B60R 16/027; B60W 2050/0014; B60W 2300/17; E02F 9/205; E02F 9/2054

See application file for complete search history.

(56) References Cited

U.S. PATENT DOCUMENTS 6,798,343 B2  9/2004  Carrier et al.
8,554,896 B2  10/2013  Sodergren et al.
(Continued)

FOREIGN PATENT DOCUMENTS

CN  115205395 A  10/2022
EP  4083335 A2  8/2022
(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.
(Continued)

*Primary Examiner* — Russell Frejd
(74) *Attorney, Agent, or Firm* — VLP Law Group LLP; James A. D. White

(57) ABSTRACT

Systems and techniques are described for an adaptive control system of powered earth-moving construction and/or mining vehicles. In some situations, the systems/techniques may receive signals from various controls of the powered earth-moving construction and/or mining vehicles that provide signals at various high-level voltages and low-level voltages and provide commands to the various controls by modifying command signals to various high-level voltages and low-level voltages. The systems/techniques may employ various modular input/output daughtercards to modify the various signals and commands.

20 Claims, 7 Drawing Sheets

Related U.S. Application Data continuation-in-part of application No. 18/227,478, filed on Jul. 28, 2023, now Pat. No. 11,898,324, said application No. PCT/US2023/037209 is a continuation-in-part of application No. 18/227,478, filed on Jul. 28, 2023, now Pat. No. 11,898,324.

(60) Provisional application No. 63/433,731, filed on Dec. 19, 2022.

(56) References Cited

U.S. PATENT DOCUMENTS

| | | | |
|---|---|---|---|
| 11,375,041 | B2 | 6/2022 | Theverapperuma et al. |
| 11,494,930 | B2 | 11/2022 | Theverapperuma et al. |
| 11,560,690 | B2 | 1/2023 | Halder et al. |
| 11,567,197 | B2 | 1/2023 | Halder |
| 2019/0123952 | A1 | 4/2019 | Hrabak et al. |
| 2020/0111169 | A1 | 4/2020 | Halder et al. |
| 2020/0150650 | A1 | 5/2020 | Jarlengrip |
| 2020/0150687 | A1 | 5/2020 | Halder et al. |
| 2020/0310442 | A1 | 10/2020 | Halder et al. |
| 2021/0017738 | A1 | 1/2021 | Sano |
| 2021/0254308 | A1 | 8/2021 | Thibblin et al. |
| 2021/0317633 | A1 | 10/2021 | Sherlock |
| 2022/0024485 | A1 | 1/2022 | Theverapperuma et al. |
| 2022/0026921 | A1 | 1/2022 | Halder |
| 2022/0042286 | A1 | 2/2022 | Tsuji et al. |
| 2022/0057513 | A1 | 2/2022 | Pihl |
| 2022/0154431 | A1 | 5/2022 | Kurosawa |
| 2022/0340171 | A1 | 10/2022 | Halder |
| 2023/0165501 | A1 | 6/2023 | Moghaddambagheri et al. |

FOREIGN PATENT DOCUMENTS

| | | |
|---|---|---|
| KR | 10-2022-0014477 | 12/2022 |
| WO | 2018099755 A1 | 6/2018 |
| WO | 2022198331 A1 | 9/2022 |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
ST LM217/LM317 Datasheet, Dec. 2021, retrieved on Aug. 22, 2022 from www.st.com/resource/en/datasheet/lm317.pdf, 34 pages.
ST LD1117 Datasheet, Feb. 2020, retrieved on Aug. 22, 2022 from www.st.com/resource/en/datasheet/ld1117.pdf, 46 pages.
Texas Instruments TCAN33x 3.3-V Can Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®-M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
Livox LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.

Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code Of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires A New Kind Of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
Livox Mid-40/Mid-100 LiDAR Specs, retrieved on Aug. 22, 2022 from https://www.livoxtech.com/mid-40-and-mid-100/specs, 2 pages.
Elaine Ball, "Top Benefits Of Using LiDAR For Construction Projects", Oct. 1, 2020, retrieved from https://csengineermag.com/top-benefits-of-using-lidar-for-construction-projects/ on Nov. 4, 2022, 4 pages.
"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.
Peter Brown, "LiDAR Improves Efficiency And Safety In Industrial Heavy Equipment", Oct. 22, 2021, retrieved from https://electronics360.globalspec.com/article/17336/lidar-improves-efficiency-and-safety-in-industrial-heavy-equipment on Nov. 4, 2022, 2 pages.
"Construction Remains Ahead In Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.
"LiDAR For Heavy Machinery", retrieved from https://innoviz.tech/applications/industrial on Nov. 4, 2022, 2 pages.
"Hitachi Construction Machinery Invests In Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.
Nakagawa et al., "Real-Time Mapping Of Construction Workers Using Multilayered LiDAR", The 40th Asian Conference On Remote Sensing 2019, Oct. 14-18, 2019, 8 pages.
Sabbir Rangwala, "LiDAR Vision—Helping Bring Autonomous Trucks To Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.
"Collision Warning On The Rear Of An Excavator With 3D LiDAR Sensors", retrieved from https://www.sick.com/ca/en/industries/mobile-automation/construction-and-mining-machines/excavator/

(56) References Cited

OTHER PUBLICATIONS collision-warning-on-the-rear-of-an-excavator-with-3d-lidar-sensors/c/p549945 on Nov. 4, 2022, 1 page.
"Autonomous Construction Vehicles", retrieved from https://www.technologycards.net/english/the-technologies/autonomous-construction-vehicles on Nov. 4, 2022, 2 pages.

ADAPTIVE CONTROL SYSTEM FOR AUTONOMOUS CONTROL OF POWERED EARTH-MOVING VEHICLES

CROSS-REFERENCE TO RELATED APPLICATIONS

This application is a continuation of co-pending international PCT Patent Application No. PCT/US2023/037209, filed Nov. 13, 2023 and entitled "Adaptive Control System For Autonomous Control Of Powered Earth-Moving Vehicles", and is a continuation-in-part of co-pending U.S. Non-Provisional patent application Ser. No. 18/227,478, filed Jul. 28, 2023 and entitled "Adaptive Control System For Autonomous Control Of Powered Earth-Moving Vehicles", now U.S. Pat. No. 11,898,324 issued Feb. 13, 2024, each of which claims the priority benefit of U.S. Provisional Patent Application No. 63/433,731, filed Dec. 19, 2022 and entitled "Adaptive Control System For Autonomous Control Of Powered Earth-Moving Vehicles", and all of which are incorporated herein by reference in their entirety. This application claims the priority benefit under 35 U.S.C. §§ 120 and 119 (a) and 363 of international PCT Patent Application No. PCT/US2023/037209 and of U.S. patent application Ser. No. 18/227,478 and of U.S. Provisional Patent Application No. 63/433,731.

TECHNICAL FIELD

The following disclosure relates generally to systems and techniques for an adaptive control system for use with autonomous control of operations of powered earth-moving construction and/or mining vehicles.

BACKGROUND

Earth-moving construction and/or mining vehicles may be used on a job site to move soil and other materials (e.g., gravel, rocks, asphalt, etc.) and to perform other operations, and are each typically operated by a human operator (e.g., a human user present inside a cabin of the vehicle, a human user at a location separate from the vehicle but performing interactive remote control of the vehicle, etc.). The human operator typically controls the movement of the various components of the earth-moving vehicle using joysticks, pedals, or other controls. In earth-moving vehicles where these controls are electronic, some of the signals that are used are low voltage signals to control various components of the earth-moving vehicle, which require low-voltage electrical outputs in order to control those signals.

Limited autonomous operations (e.g., performed under automated programmatic control without human user interaction or intervention) of some earth-moving vehicles have occasionally been used, but existing techniques suffer from a number of problems, including the use of limited types of sensed data, an inability to perform fully autonomous operations when faced with on-site obstacles, an inability to coordinate autonomous operations between multiple on-site earth-moving vehicles, requirements for bulky and expensive hardware systems to support the limited autonomous operations, etc.

DETAILED DESCRIPTION

Figure 1:
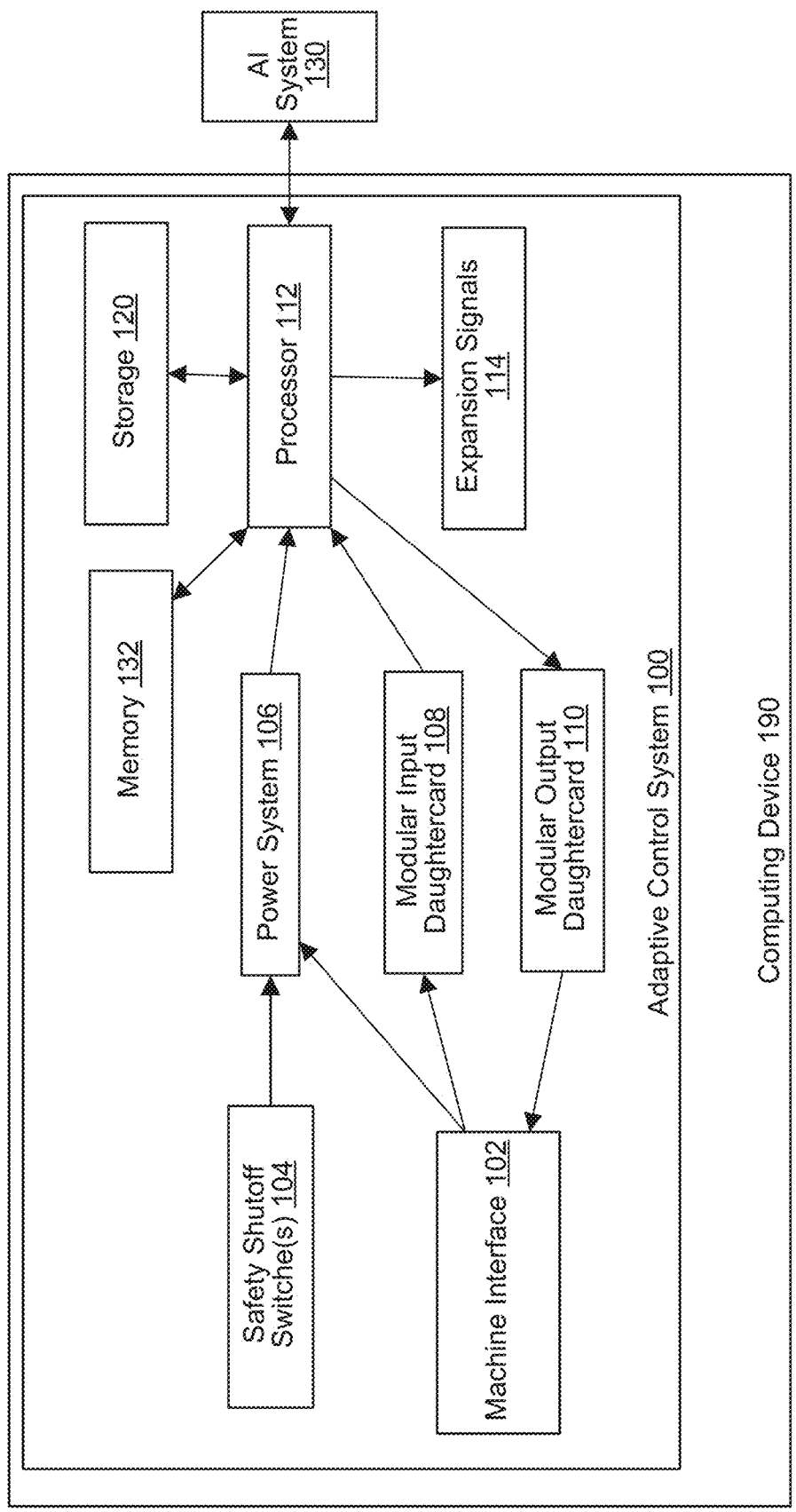
FIG. 1 is a diagram illustrating an example embodiment of using described systems and techniques for an adaptive control system of one or more powered earth-moving construction and/or mining vehicles on a site.

Systems and techniques are described for implementing adaptive control systems for use with autonomous control of operations of powered earth-moving construction and/or mining vehicles, such as a hardware component architecture for use in autonomous control of operations of one or more such vehicles on a site (e.g., to automatically determine and control movement of an excavator vehicle's boom/arm and attachment to move materials or perform other actions). In at least some embodiments, the described systems and techniques are used to perceive positions of one or more joysticks and pedals of a powered earth-moving construction and/or mining vehicle (referred to at times more generally herein as an "earth-moving vehicle"), such as by modifying input signals and sending output signals that can be transformed to various power levels for different components of one or more such earth-moving vehicles to implement fully autonomous operations of the earth-moving vehicles. Such earth-moving vehicles may include, for example, one or more tracked or wheeled excavators, bulldozers, front loaders, skip loaders, graders, cranes, backhoes, compactors, conveyors, trucks, deep sea machinery, extra-terrestrial machinery, demining ploughs, etc., and may each receive and implement one or more defined movement instructions (e.g., dig a hole of a specified size and/or shape and/or at a specified location, move one or more rocks from a specified area, trenching, breaching, etc.) and/or otherwise operate to accomplish one or more other goals, including in at least some embodiments and situations to do so when faced with possible on-site obstacles (e.g., man-made structures, rocks and other naturally occurring impediments, other equipment, people or animals, etc.) and/or to implement coordinated actions of multiple such earth-moving vehicles (e.g., multiple excavator vehicles, an excavator vehicle and one or more other construction and/or mining vehicles of one or more other types, etc.).

As one non-exclusive example, the described systems and techniques may in some embodiments include a hardware architecture that includes sensors of multiple types positioned at various different points on a powered earth-moving construction and/or mining vehicle (e.g., an excavator vehicle) at a site, and one or more hardware controllers (e.g., microcontrollers) used to obtain and analyze the sensor data for use in determining movement instructions of one or more such vehicles that can then be used with a modular output daughtercard to send signal outputs to different components of the earth-moving vehicle. Additional details related to the hardware architecture and to related techniques for implementing autonomous control of powered earth-moving construction and/or mining vehicles in particular manners are described below, and in other embodiments some or all of the described techniques are performed by an earth-moving vehicle movement control system to control one or more such earth-moving vehicles of one or more types. While some illustrative examples are discussed below with respect to an adaptive control system to control one or more excavator vehicles, it will be appreciated that the same or similar techniques may be used to control one or more other non-excavator earth-moving construction and/or mining vehicles.

As noted above, in at least some embodiments, as shown with respect to FIG. 1, data may be obtained and used by the adaptive control system (ACS) 100 from sensors of multiple types positioned on or near a construction and/or mining vehicle, such as one or more of GPS location data, track and cabin heading data, visual data of captured image(s), depth data from LiDAR and/or other depth-sensing and proximity devices, infrared data, real-time kinematic positioning information based on GPS data and/or other positioning data, inclinometer data for particular moveable parts of an earth-moving vehicle (e.g., the digging boom/arm/attachment of an excavator vehicle), etc. For example, one or more types of GPS antennas and associated components may be used to determine and provide GPS data in at least some embodiments. In addition, one or more types of LIDAR devices may be used in at least some embodiments to determine and provide depth data about an environment around an earth-moving vehicle (e.g., to determine a 3D, or three-dimensional, model of some or all of a job site on which the vehicle is situated) and in some embodiments, other types of depth-sensing and/or 3D modeling techniques may be used, whether in addition to or instead of LIDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments. Moreover, real-time kinematic positioning information for components of an earth-moving vehicle may be determined from a combination of GPS data and other positioning data and/or a radio that receives RTK correction data. Other hardware components that may be positioned on or near an earth-moving vehicle and used to provide data and/or functionality used by the ACS include the following: one or more inclinometers (e.g., single axis and/or double axis) or other accelerometers; a CAN bus message transceiver; one or more low-power microcontrollers, such as to execute and use executable software instructions and associated data of the ACS 100; one or more voltage converters and/or regulators; a voltage level shifter; etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle of the same type or a different type; etc.), with the combination of data used in one or more types of autonomous operations as discussed herein.

As is also noted above, automated operations of an earth-moving vehicle by the ACS 100 may include determining current location and other positioning of an earth-moving vehicle on a site in at least some embodiments. As one non-exclusive example, such position determination may include using one or more track sensors (or wheel sensors in other embodiments) to monitor whether or not the earth-moving vehicle's tracks or wheels are aligned in the same direction as the cabin, and using GPS data (e.g., from three or more GPS antennas located on the earth-moving vehicle's cabin or other positions of an earth-moving vehicles chassis/body) in conjunction with inertial navigation system to determine the rotation of the cabin chassis (e.g., relative to true north), as well as to determine an absolute location of the vehicle's body and/or other parts. When using data from multiple GPS antennas, the data may be integrated in various manners, such as by using a microcontroller located on the earth-moving vehicle, and with additional RTK (real-time kinematic) positioning data used to provide an RTK-enabled GPS positioning unit that reinforces and provides further precision with respect to the GPS-based location (e.g., in some implementations, to achieve 1-inch precision or better). In addition, in some embodiments and situations, LiDAR data is used to assist in position determination operations, such as by surveying the surroundings of the earth-moving vehicle (e.g., an entire job site on which the earth-moving vehicle is located) and confirming a current location of the earth-moving vehicle (e.g., relative to a three-dimensional, or 3D, map of the job site generated from the LIDAR data). Additional details are included below regarding such automated operations to determine current location and other positioning of an earth-moving vehicle on a site.

In addition, automated operations using an ACS 100 may further include receiving instructions from an AI system 130 that determines at least some of the actions or movement commands to control movement of some or all of an earth-moving vehicle components (e.g., an excavator vehicle's boom/arm and attachment) to move materials or perform other actions for the one or more tasks on a job site or other geographical area, and with the ACS 100 used to send corresponding modular outputs to the earth-moving vehicle's components. In addition, the autonomous operations of the earth-moving vehicle to perform one or more tasks may be initiated in various manners, such as by an operator component of the AI system 130, in part or in whole based on input received from one or more human users or other sources, etc.

The activities of this non-exclusive embodiment may further be implemented by a system comprising one or more hardware processors; a plurality of sensors mounted on an earth-moving vehicle to obtain vehicle data about the earth-moving vehicle, including a real-time kinematic (RTK)-enabled positioning unit using GPS data from one or more GPS antennas on the cabin of the earth-moving vehicle, and one or more inclinometers; a plurality of additional sensors to obtain environment data about an environment surrounding the earth-moving vehicle, including at least one of one or more LiDAR sensors, or one or more image capture devices; and one or more storage devices having software instructions that, when executed by at least one processor of the one or more hardware processors, cause the at least one processor to perform automated operations to implement any or all of the activities described above, and optionally further comprising the earth-moving vehicle. The activities of this non-exclusive embodiment may further be implemented using stored contents on a non-transitory computer-readable medium that cause one or more computing devices to perform automated operations to implement any or all of the activities described above.

In addition, while the autonomous operations of an earth-moving vehicle controlled by the ACS 100 may in some embodiments be fully autonomous and performed without any input or intervention of any human users using the ACS 100, in other embodiments the autonomous operations of an earth-moving vehicle controlled by the ACS 100 may include providing information to one or more human users about the operations of the ACS 100 and optionally receiving information from one or more such human users (whether on-site or remote from the site) that are used as part of the automated operations of the AI system 130 (e.g., one or more target tasks, a high-level work plan, etc.), such as via one or more GUIs ("graphical user interfaces") displayed on one or more computing devices that provide user-selectable controls and other options to allow a user to interactively request or specify types of information to display and/or to interactively provide information for use by the ACS 100.

For illustrative purposes, some embodiments are described below in which specific types of data are acquired and used for specific types of automated operations performed for specific types of powered earth-moving construction and/or mining vehicles, and in which specific types of autonomous operation activities are performed in particular manners. However, it will be understood that such described systems and techniques may be used with other types of data and vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to an earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts that may be used to implement at least some of the described systems and techniques for implementing autonomous control of powered earth-moving construction and/or mining vehicles, such as to automatically determine and control movement of an earth-moving vehicle's hydraulic arm(s) and/or attachment(s) (e.g., a digging bucket) to move materials or perform other actions in accordance with specified tasks.

FIG. 1 is a diagram illustrating an example embodiment of an Adaptive Control System ("ACS") 100. The ACS 100 may be implemented on one or more network-accessible configured computing devices 190, whether integrated with a particular earth-moving vehicle (e.g., such as located on an earth-moving vehicle, not shown in FIG. 1) or with multiple earth-moving vehicles (e.g., operating in a distributed manner on the multiple vehicles, such as one computing device on each of the multiple vehicles that are interacting in a peer-to-peer manner), or instead remote from one or more such earth-moving vehicles (e.g., in communication with one or more such earth-moving vehicles over one or more networks). In some embodiments, one or more other computing devices or systems may further interact with the ACS 100 (e.g., to obtain and/or provide information), such as one or more other computing devices each having one or more associated users, and/or one or more other computing systems (e.g., to store and provide data, to provide supplemental computing capabilities, etc.). The one or more computing devices may include any computing device or system that may receive data and/or requests and take corresponding actions (e.g., store the data, respond to the request, etc.) in the manners discussed herein.

Figure 2A:
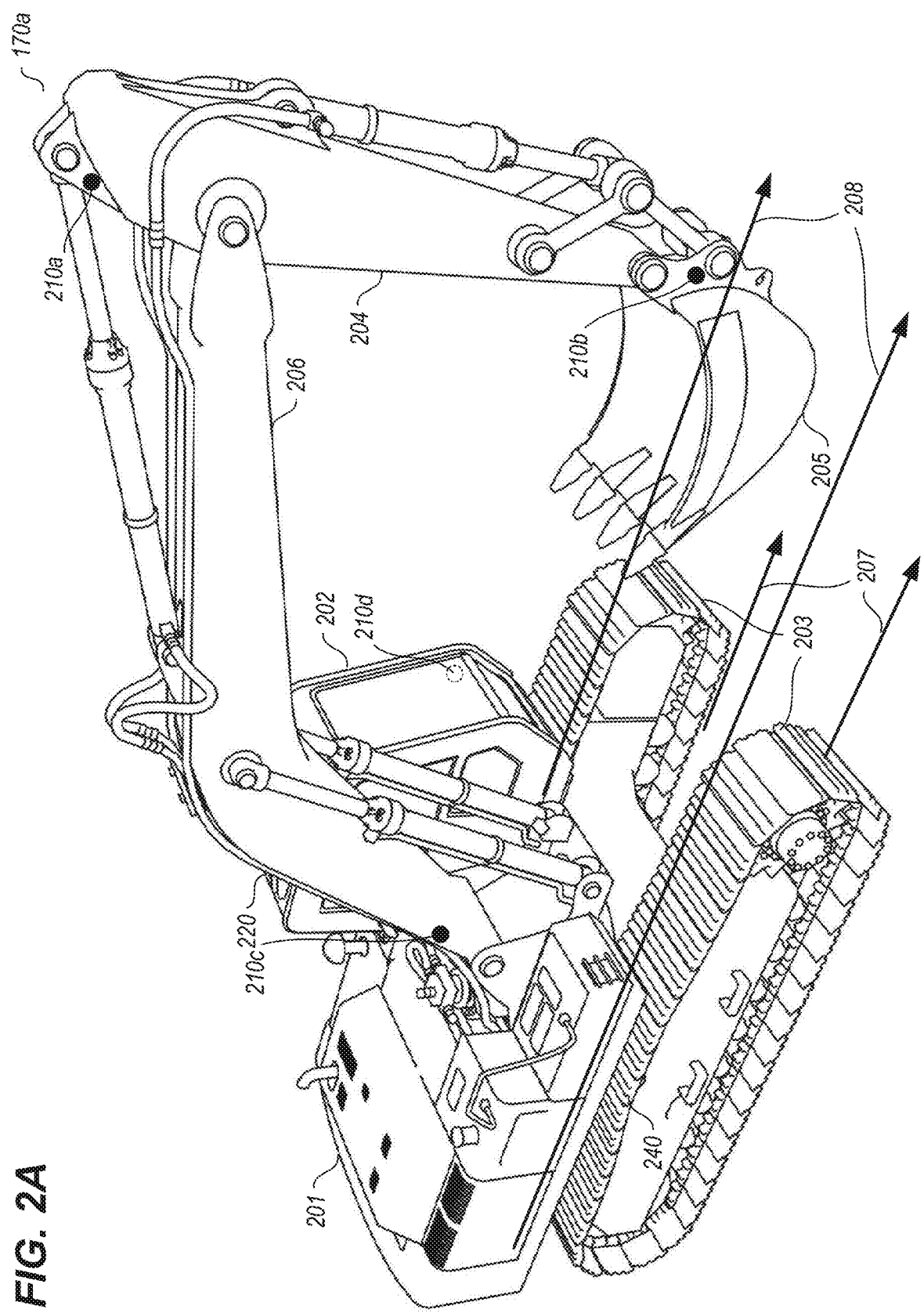
FIGS. 2A-2C illustrate examples of powered earth-moving construction and/or mining vehicles having multiple types of on-vehicle data sensors positioned to support autonomous operations on a site for use with an adaptive control system.
Figure 2B:
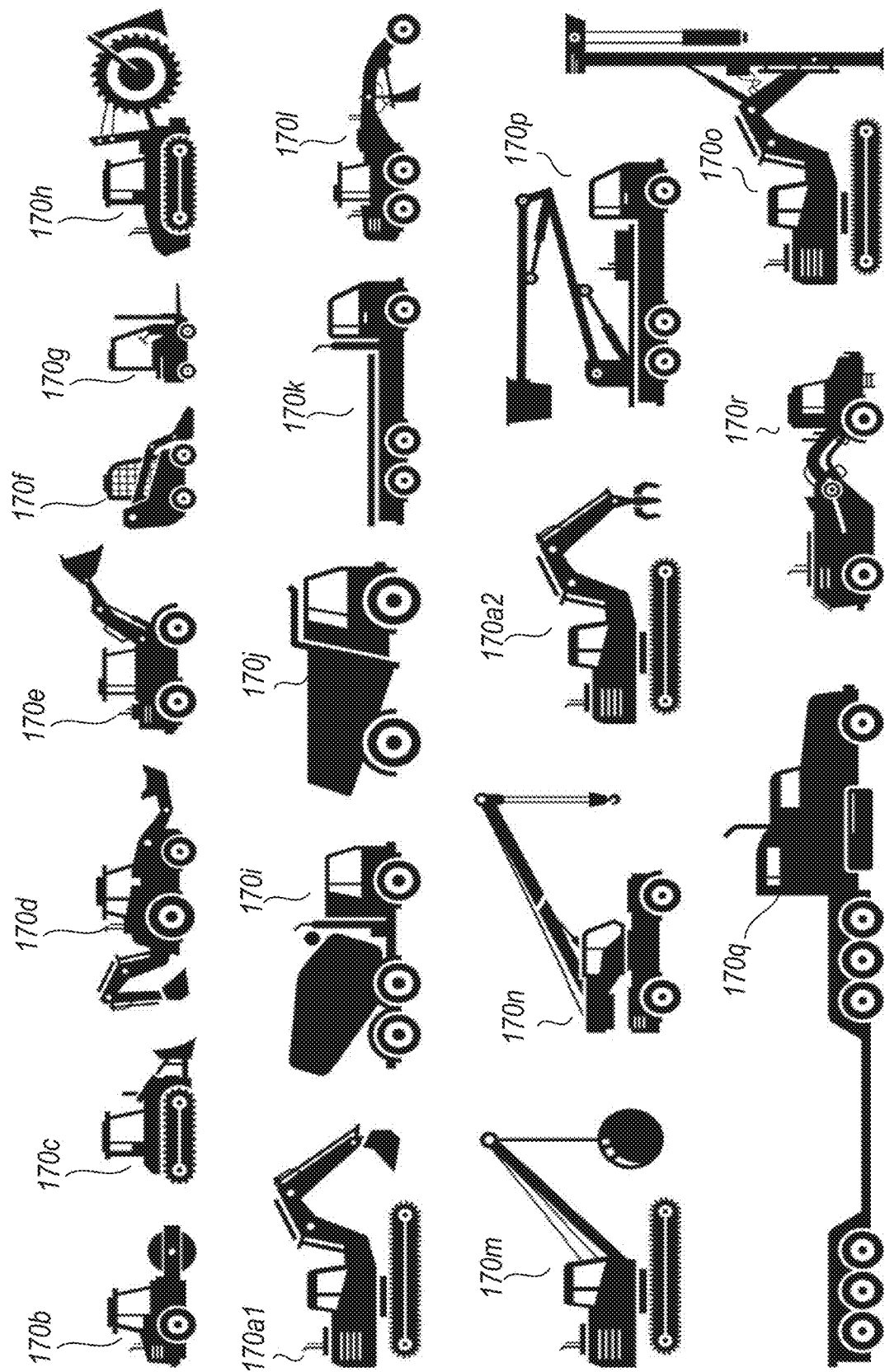
Figure 2C:
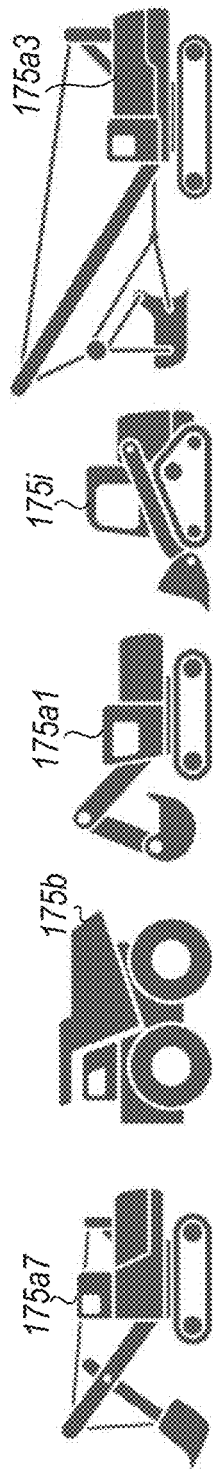
Figure 2C:
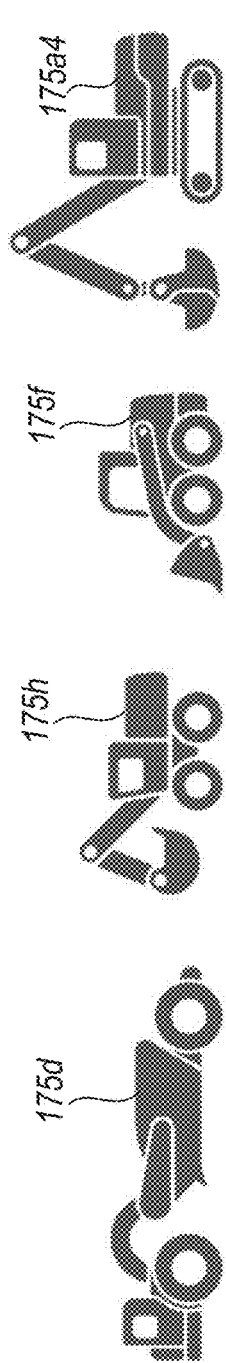
Figure 2C:
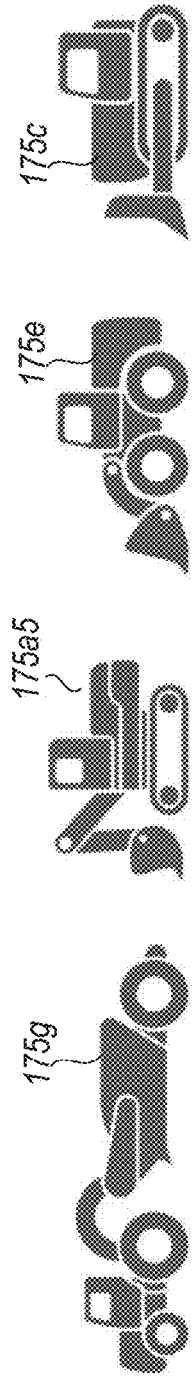
Figure 2C:
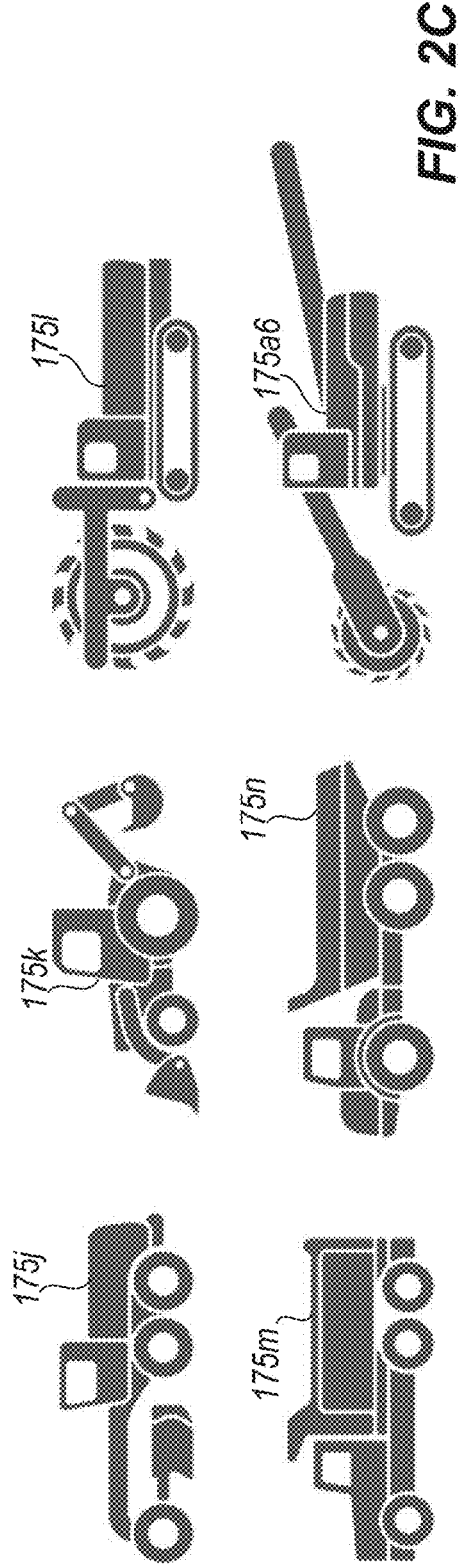

In particular, in this example as shown, and as further shown with respect to FIGS. 2A-2C, an earth-moving vehicle 170/175 (e.g., a construction vehicle 170 and/or a mining vehicle 175), which in this illustrated example is a tracked excavator vehicle 170a, includes a variety of sensors to obtain and determine information about the earth-moving vehicle 170 and its surrounding environment (e.g., a job site on which the earth-moving vehicle is located), including one or more GPS antennas 220, an RTK-enabled GPS positioning unit (not shown) that receives GPS signals from the GPS antenna(s) and RTK-based correction data from a remote base station (not shown) and optionally other data from one or more other sensors and/or devices (e.g., an inertial navigation system, not shown), one or more inclinometers and/or other position sensors 210, one or more track sensors 240, one or more image sensors (e.g., part of one or more cameras or other image capture devices, not shown), one or more LiDAR emitters and/or sensors (not shown), one or more infrared sensors (not shown), one or more microcontrollers or other hardware CPUs (not shown), one or more material analysis sensor(s), etc. The ACS 100 and/or the AI system 130 obtains some or all of the data from the sensors on the earth-moving vehicle 170, stores the data in corresponding databases or other data storage formats on storage (e.g., sensor data, position information, location information, vehicle information, environment information, etc.), and uses the data along with an AI system 130 to perform automated operations involving controlling autonomous operations of the earth-moving vehicle.

One or more other earth-moving vehicles 170x and/or 175x may similarly be present (e.g., on the same job site as earth-moving vehicle 170/175) and include some or all such components and/or the ACS 100 (although not illustrated here for the sake of brevity) and have corresponding autonomous operations controlled by the ACS 100. The computing device(s) 190 may be part of a network (not shown) which may be of one or more types (e.g., the Internet, one or more cellular telephone networks, etc.) and in some cases may be implemented or replaced by direct wireless communications between two or more devices (e.g., via Bluetooth; LoRa, or Long Range Radio; etc.). In addition, other embodiments may similarly gather and use other types of data, whether instead of or in addition to the illustrated types of data, including non-exclusive examples of image data in one or more light spectrums, non-light energy data, location data of types other than from satellite-based navigation systems, depth or distance data to objects, sound data, etc. In addition, in some embodiments and situations, different devices and/or sensors may be used to acquire the same or overlapping types of data (e.g., simultaneously or sequentially), and the ACS 100 may combine or otherwise use such different types of data, including to determine differential information for a type of data.

It will be appreciated that computing devices 190, computing systems and other equipment (e.g., earth-moving vehicle(s)) included within FIG. 1 and FIGS. 2A-2C are merely illustrative and are not intended to limit the scope of the present invention. The systems and/or devices may instead each include multiple interacting computing systems or devices, and may be connected to other devices that are not specifically illustrated, including via Bluetooth communication, a mesh network, or other direct inter-device communication, through one or more networks such as the Internet, via the Web, or via one or more private networks (e.g., mobile communication networks), etc. More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated ACS 100 may in some embodiments be distributed in various components, some of the described functionality of the ACS 100 may not be provided, and/or other additional functionality may be provided.

It will also be appreciated that, while various items may be stored in memory 132 or on storage 120 while being used, these items or portions of them may be transferred between memory 132 and other storage devices for purposes of memory management and data integrity and execution/use. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory 132 and/or storage 120 when configured by one or more software programs (e.g., by the ACS 100 executing on computing device(s) 190) such as by execution of software instructions of the one or more software programs and/or by storage of such software instructions and/or data structures, and such as to perform algorithms and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

As shown in FIG. 1, the ACS 100 may be operating on one or more computing device(s) 190 and may communicate with an AI system 130 via ethernet, wireless link, closed-loop communication system, or other communication means to provide information to and receive movement commands from the AI system 130. As shown in FIG. 1, the ACS 100 may include, among other things, a machine interface 102, one or more safety shutoff switch(es) 104, a power system 106, a modular input daughtercard 108, a modular output daughtercard 110, a processor 112, expansion signals 114, a storage 120, and/or a memory 132.

The machine interface 102 may include software and/or logic for an interface that connects to one or more controls of the powered earth-moving construction and/or mining vehicle 170/175. The machine interface 102 may receive inputs representing various controls from the powered earth-moving construction and/or mining vehicle 170/175 and also send outputs to the various controls of the powered earth-moving construction and/or mining vehicle 170/175. In some implementations, controls may include power inputs/outputs, one or more joysticks, a horn, switches, transmission controls, one or more pedals, one or more safety levers, etc. The machine interface 102 may receive various input signals from the controls and pass those along to other components of the ACS 100 for further processing. The machine interface 102 may receive one or more output commands from a modular output daughtercard 110 and may send the output commands to the appropriate controls of the powered earth-moving construction and/or mining vehicle 170/175. In some implementations, the machine interface may include software and hardware components for connecting to the various controls of the powered earth-moving construction and/or mining vehicle 170/175. In some implementations, the machine interface 102 provides signals to the power system 106, such as when a power control or transmission control of the powered earth-moving construction and/or mining vehicle 170/175 is activated and the machine interface 102 can send that command to the power system 106 to turn on/off the power or adjust the power system 106 based on the command. The machine interface 102 may effect a set of mechanical movements on an earth-moving vehicle corresponding to a set of movement instructions.

The safety shutoff switch(es) 104 may be hardware switches, software switches, or a combination of software and hardware switches that can be used to control the power system 106. In some implementations, the safety shutoff switch(es) 104 may be used to shut off power to the ACS 100, such as in response to a threshold event being met, such as a detected power surge or transient voltage that exceeds a threshold value. In further implementations, the safety shutoff switch(es) 104 may be used to shut off the power that goes to the output drivers, meaning the adaptive control system 100 can stop sending the earth-moving construction and/or mining vehicle 170/175 any signals, but the adaptive control system 100 still has power and is running. In some implementations, the safety shutoff switch(es) 104 may be operated by a user, and when activated or actuated may cause the power system 106 to shutoff and stop use of one or more of the powered earth-moving construction and/or mining vehicle 170/175, a control of the powered earth-moving construction and/or mining vehicle 170/175, a component of the powered earth-moving construction and/or mining vehicle 170/175, etc.

The ACS 100 may include one or more power system(s) 106 that cause the powered earth-moving construction and/or mining vehicle 170/175 and/or the components of the powered earth-moving construction and/or mining vehicle 170/175 to operate. In some implementations, the power system 106 may be the power system 106 previously installed in the powered earth-moving construction and/or mining vehicle 170/175, (e.g., the machine voltage). In some implementations, the earth-moving construction and/or mining vehicle 170/175 take the power supplied by the vehicle system (e.g., the machine voltage) and converts that power supply for use by the ACS 100, such as in a power tree circuit as described herein. In some implementations, the power system 106 may be capable of performing ultra-low thermal emissions. In some implementations, the power system 106 may be transient-protected.

In some implementations, the power system 106 may include a machine voltage (such as 12V/14V/24V) as a direct input which is then monitored with a time constant, such as on a gate of a PMOS, to provide external safety monitoring module that can shutoff or disable the entire power system 106 as needed based on thresholds being met or a manual shutoff. The power system 106 may include overvoltage protection, undervoltage lockout, fault detection, reverse polarity protection, and/or transient protection. In some implementations, the power tree may be split for redundancy and/or power sharing. The split power tree may allow for redundancy if one part fails, the second split can step in and provide the power in the event of the failure. In further implementations, power sharing may allow for various components of the system to all use the power tree without affecting the provided voltages.

Figure 3A:
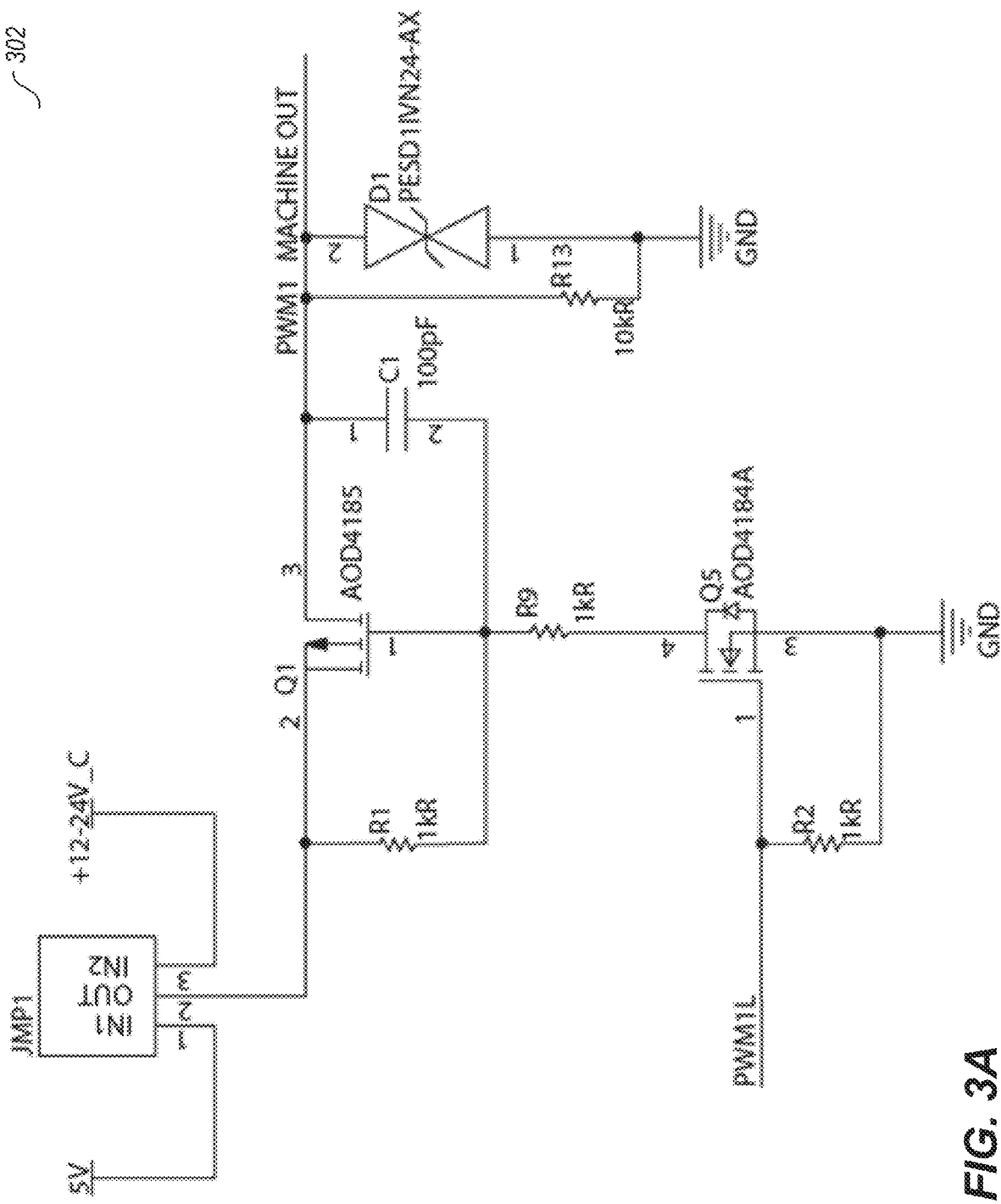
FIGS. 3A-3B illustrate examples of level shifters for use in modular daughtercards.
Figure 3B:
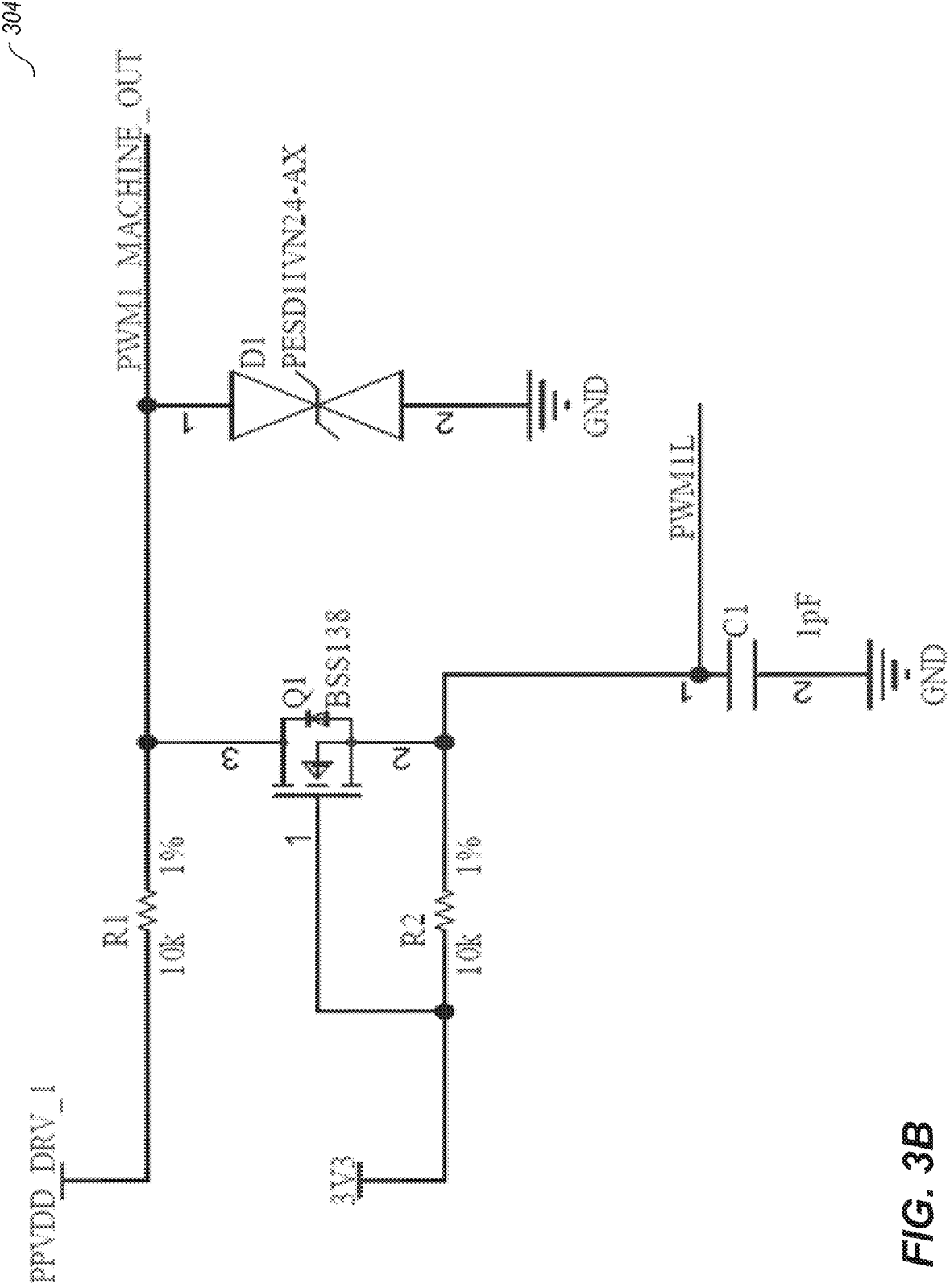

The ACS 100 may include one or more modular input daughtercards 108. The modular input daughtercard 108 may be a removable circuit board that is configured to be installed within the ACS 100 to further expand the options for adaptive control. In some implementations, the ACS 100 may act as a motherboard or mothercard with respect to the modular input daughtercard 108 and/or with respect to the modular output daughtercard 110. In some implementations, the modular input daughtercard 108 may be configured to receive various signals from the machine interface 102 representing different control signals of the powered earth-moving construction and/or mining vehicle 170/175, and the modular input daughtercard 108 may modify the incoming signals to signals that can be processed by the processor 112, such as by modifying signals from a machine voltage to a native voltage of the ACS 100 (such as 3.3 V or 5V in various implementations). By using a modular input daughtercard 108 that is removable and can be switched out for different modular input daughtercards 108, the ACS 100 can be used in a variety of different powered earth-moving construction and/or mining vehicles 170/175, and depending on the types of controls sending signals to the machine interface 102, different modular input daughtercards 108 can be installed without having to reconfigure or change the entire ACS 100. In further implementations, if supply chain issues necessitate changes to the modular input daughtercards 108, the changes can be made to the modular input daughtercards 108 without replacing other components of the ACS 100 (e.g., the motherboard/mothercard). In some implementations the modular input daughtercard 108 may modify the incoming signals by boosting or lowering and filtering incoming signal voltage levels. For example, some of the controls of the powered earth-moving construction and/or mining vehicle 170/175 may provide low voltage signals, while other controls of the powered earth-moving construction and/or mining vehicle 170/175 may provide higher voltage signals and the modular input daughtercard 108 may receive both the low voltage signals and the higher voltage signals and modify those different levels of voltages. In some implementations, the modular input daughtercard 108 may also act as the module output daughtercard 100 to modify outputs from the ACS 100 and shift voltage levels from the ACS 100 back to the low voltage signals and/or high voltage signals for the controls of the powered earth-moving construction and/or mining vehicle 170/175, such that a single physical daughtercard card acts as both the modular input daughtercard 108 to shift inputs and the modular output daughtercard 110 to shift outputs and two separate physical daughtercards are not used. In this example, a single modular input daughtercard 108 could shift both input voltage levels from the controls of the powered earth-moving construction and/or mining vehicles 170/175 to signals that can be processed by the processor 112 and the modular input daughtercard 108 can also receive outputs from the processor 112 of the ACS 100 and shift those output voltages back to appropriate voltages of the controls of the powered earth-moving construction and/or mining vehicles 170/175. In some implementations, when a single daughtercard is used to modify inputs and outputs, the single daughtercard may include the circuitry shown in both FIGS. 3A and 3B, while in other implementations, other types of level shifters to alter the incoming and/or outgoing voltages are also contemplated, and the circuitry shown in FIGS. 3A and 3B are merely examples. In addition, in some implementations, the modular input daughtercard 108 may include one or more bypass circuits that allow signals to be passed from the controls of the powered earth-moving construction and/or mining vehicle 170/175 to the processor 112 without modifying the signals. In some implementations, the bypass options may include non-stuffed resistors to bypass the modular input daughtercard 108 modifications of the voltages of the input signals. In addition, in some implementations, the ACS 100 may include only a modular input daughtercard 108 to alter inputs and may not include a modular output daughtercard 110, while in other implementations, the ACS 100 may include only a modular output daughtercard 110 to alter outputs and may not include a modular input daughtercard 108.

The ACS 100 may include a processor 112 that uses software and/or logic to receive various signals from the modular input daughtercard 108 and/or the power system 106 and can provide output instructions using the modular output daughtercard 110 and/or the expansion signals 114. In some implementations, the processor 112 may be configured to send and/or receive information from the AI system 130, such as providing control signals received from the machine interface 102 to the AI system 130, and receiving movement commands in the form of output signals that can be sent to the modular output daughtercard 110 and/or the expansion signals 114. In some implementations, the processor 112 may generate sets of movement instructions based on the incoming signals from various components of the earth-moving constructions and/or mining vehicles 170/175 and/or any machine learning instructions from the AI system 130. The processor 112 may then provide the generated sets of movement instructions to the corresponding components of the earth-moving constructions and/or mining vehicles 170/175 using the modular output daughtercard 110. In some implementations, the processor 112 can also provide dynamic voltage changes for inputs to outputs. For example, if a specific component requires a specific power output, such as a 24V output. The processor 112 can include as one of the commands to the output daughtercard 110 what voltage level to level shift/modify the command to for that specific component. Using dynamic level shifting, any configuration of inputs/outputs can be selected using a group of level shifters on the daughtercards and just selecting various sides of each of the level shifters to achieve specific voltage configurations.

The ACS 100 may include a modular output daughtercard 110, which may be a removable circuit board that is configured to be installed within the ACS 100 to further expand the options for adaptive control. In some implementations, the modular output daughtercard 110 may be configured to receive various commands from the processor 112, such as sets of movement instructions, and the modular output daughtercard 110 may modify the incoming commands from the processor 112 to signals at a higher or lower voltage for different controls of various components of the powered earth-moving construction and/or mining vehicle 170/175. In other implementations, the modular output daughtercard 110 may modify the incoming signals to completely different signal types. For example, the modular output daughtercard 110 may receive a PWM signal and convert it to a static analog output voltage (i.e., 50% PWM=1.65V output, 25% PWM=0.825V). By using a modular output daughtercard 110 that is removable and can be switched out for different modular output daughtercards 110, the ACS 100 can be used in a variety of different powered earth-moving construction and/or mining vehicles 170/175, and depending on the types of controls and needed voltage levels to which the modular output daughtercard 110 is sending commands, different modular output daughtercards 110 can be installed without having to reconfigure or change the entire ACS 100. In further implementations, the modular system allows portions of the ACS 100 to be redesigned, such as to address supply chain issues, etc. and only the updated portions, such as the output daughtercard 110, may be replaced without changing other components of the ACS 100. In some implementations, the modular output daughtercard 110 may modify the outgoing commands by boosting or lowering outgoing signal voltage levels. For example, some of the controls of the powered earth-moving construction and/or mining vehicle 170/175 may receive commands as low voltage signals, while other controls of the powered earth-moving construction and/or mining vehicle 170/175 may receive commands as higher voltage signals and the modular output daughtercard 110 may output both the low voltage signals and the higher voltage signals and modify those different levels of voltages. In some implementations, the modular output daughtercard 110 may amplify the various signals using an amplifier. In some implementations, the amplifier of the modular output daughtercard 110 may be configurable in real-time or substantially real-time. In some implementations, the amplifier may be an application-specific output drive amplifier. In some implementations, the modular output daughtercard 110 and the modular input daughtercard 108 may include a plurality of optically isolated PWM (pulse width modulation) input read amplifiers, one for each PWM machine input signal, allowing the ACS 100 to read variable voltage PWM inputs ranging from 3.3V to 20V and shift them to a 0-5V range.

In some implementations, the modular output daughtercard 110 may include one or more bypass circuits, such as a set of physical bypass options (e.g., not stuffed resistors), that allow signals to be passed from the processor 112 to the controls of the powered earth-moving construction and/or mining vehicle 170/175 without modifying the signals and instead allowing the signals to be directly routed to and from the processor 112. In some implementations, the removable output daughtercard 110 may modify a set of movement instructions by taking a signal from the processor at some operating logic level (e.g., 3.3V) and modifying it to a different logic level (e.g. 5V), a static output voltage, a range of analog values, a boosted PWM signal, or an attenuated PWM signal. In some implementations, the ACS 100 may include one or more expansion signals 114 forming expansion signal support systems. The expansion signals 114 may allow for different configurations expansion controls to be added to the ACS 100 for further modular configurations. In some implementations, the expansion signals 114 may configured to connect to one or more digital drives, one or more analog drives, and/or one or more binary switch(es). In some implementations, the expansion signals 114 may include one or more amplifiers and the amplifier may be configurable in substantially real-time.

In one example implementation, the expansion signals 114 may include an shift register, such as an 8-bit shift register, configured to take microcontroller signals (such as from the processor 112), such as three microcontroller signals in an 8-bit shift register example, and allow control of outputs that are connected to opto-isolated driver circuits including an optocoupler that receives shift register inputs, a configurable drive voltage from either the power system 106 (e.g., machine voltage such as a 12V or 24V) or a circuit board powers supply (e.g., a native voltage such as 5V), and an output that is connected to an amplifier (such as an NMOS), where the MOSFET drain is connected to a jumper, allowing for in-field selection of either the power supply voltage or the circuit board power supply. In some implementations, the circuit includes voltage transient protection and a flyback diode on the output. In some implementations, the ACS 100 may include one or more low-power microcontrollers with a signal interconnect between them, the microcontrollers may act as portions of the ACS 100 or be specific components, such as the modular input daughtercard 108 and/or the modular output daughtercard 110. The ACS 100 may include one or more status indicators, such as multi-color LEDs that can indicate various board states, such as fault and/or fault type to provide information to the user about board state.

FIG. 2A illustrates examples of an excavator vehicle as a type of powered earth-moving construction and/or mining vehicle 170/175 having multiple types of on-vehicle data position sensors 210 positioned to support autonomous operations on a site. In particular, with respect to FIG. 2A, an example excavator vehicle 170/175 is illustrated using an upper-side-frontal view from the side of the digging boom 206 and arm (or 'stick') 204 and opposite the side of the cabin 202, with the excavator vehicle further having a main body chassis 201 (e.g., enclosing an engine and counterweight, and including the cabin 202), tracks 203 and bucket (or 'scoop' or 'claw') attachment 205—in other embodiments, digging arm attachments other than a bucket may be used such as, for example, a hydraulic thumb, coupler, breaker, compactor, digging bucket, grading bucket, hammer, demolition grapple, tiltrotator, etc. In the example embodiment, four example position sensors (such as inclinometers) 210a-201d are further illustrated at positions that beneficially provide position data to compute the location of the bucket 205 and other parts of the digging boom 206/arm 204 relative to the cabin 202 of the excavator vehicle 170/175. In this example, three position sensors 210a-210c are mounted at respective positions on the digging boom 206/arm 204 of the excavator vehicle (position 210c near the intersection of the digging boom and the body of the excavator vehicle, position 210*b* near the intersection of the digging arm and the bucket attachment, and position 210*a* near the intersection of the digging boom and arm), and with a fourth position sensor 210*d* mounted within the cabin of the excavator vehicle and illustrated at an approximate position using a dashed line, such as to use a dual-axis inclinometer that measures pitch and roll-data from the inclinometers may be used, for example, to track the position of the excavator boom/arm/attachment, including when a track heading direction 207 is determined to be different from a cabin/body heading direction 208 (not shown in this example). It will be appreciated that other quantities, positionings and types of inclinometers may be used in other embodiments. In some implementations, the excavator vehicle 170/175 may also include GPS antennas 220 at positions that beneficially provide GPS data to assist in determining the positioning and direction of the cabin/body, including to use data from the three GPS antennas to provide greater precision than is available from a single GPS antenna. In this example, the GPS antenna 220 may be positioned on the earth-moving body chassis and proximate to three corners of the chassis (e.g., as far apart from each other as possible, such as at as a forward position on the left side of the cabin, a backward position on the left side of the cabin, and a forward position on the right side of the cabin), such that differential information between GPS antennas 220 may provide cabin heading direction information, and lateral direction information at approximately 90° from that cabin heading direction information.

FIG. 2B continues the example of FIG. 2A, with FIG. 2B illustrating information about a variety of non-exclusive example types of powered earth-moving construction vehicles 170 that may be controlled by embodiments of the ACS 100, including two example earth-moving tracked construction excavator vehicles 170*a* shown with different attachments (excavator vehicle 170*a*1 with a bucket attachment, and excavator vehicle 170*a*2 with a grapple attachment) that may be controlled by the ACS 100. Other example types of earth-moving construction vehicles 170 that are illustrated include a bulldozer 170*c*; a backhoe loader 170*d*; a wheel loader 170*e*; a skid steer loader 170*f*; a dump truck 170*j*; a forklift 170*g*; a trencher 170*h*; a mixer truck 170*i*; a flatbed truck 170*k*; a grader 170*l*; a wrecking ball crane 170*m*; a truck crane 170*n*; a cherry picker 170*p*; a heavy hauler 170*q*; a scraper 170*r*; a pile driver 170*o*; a road roller 170*b*; etc. It will be appreciated that other types of earth-moving construction vehicles may similarly be controlled by the ACS 100 in other embodiments. In a similar manner, FIG. 2C illustrates information about a variety of non-exclusive example types of earth-moving mining vehicles 175 that may similarly be controlled by embodiments of the ACS 100, including several example earth-moving tracked mining excavator vehicles 175*a* shown with different attachments (excavator vehicle 175*a*1 with a bucket attachment, excavator vehicle 175*a*3 with a dragline attachment, excavator vehicle 175*a*4 with a clamshell extractor attachment, excavator vehicle 175*a*5 with a front shovel attachment, excavator vehicle 175*a*6 with a bucket wheel extractor attachment, excavator vehicle 175*a*7 with a power shovel attachment, etc.) that may be controlled by the ACS 100. Other example types of earth-moving mining vehicles 175 that are illustrated include a dump truck 175*m*; an articulated dump truck 175*n*; a mining dump truck 175*b*; a bulldozer 175*c*; a scraper 175*d*; a tractor scraper 175*g*; a wheel loader 175*e*; a wheeled skid steer loader 175*f*; a tracked skid steer loader 175*i*; a wheeled excavator 175*h*; a backhoe loader 175*k*; a motor grader 175*j*; a trencher 175*l*; etc. It will be appreciated that other types of earth-moving mining vehicles may similarly be controlled by the ACS 100 in other embodiments and these various vehicles 170 and 175 benefit from having modular input daughtercards 108 and modular output daughtercards 110 to allow for the variety of different voltage levels for controls of each of the different vehicles 170 and 175.

FIG. 3A is an example embodiment of a level shifter 302 circuit that can be leveraged for modifying inputs/outputs to different voltages. As shown in FIG. 3A, level shifter 302 may include a plurality of non-isolated optically isolated output driver load switch amplifiers for PWM signals, such as fourteen level shifters in some implementations. The plurality of load switch amplifiers allow the ACS 100 to drive both low current and high current PWM outputs at varying voltages. In some implementations, the low current PWM may be powered by an on-board power system. In some implementations, there may be a 12V-24V selectable voltage rail that provides power to a higher-current PWM channel capable of outputting 1.5 A per channel. In some implementations, this implementation of the level shifter 302 may be used in older generations of powered earth-moving construction and/or mining vehicle 170/175 that used a hydraulic manifold with solenoid valves to control various components. The high current drive uses the load switches in the level shifter 302 with the high current transistors to modify the voltage levels.

FIG. 3B is another example embodiment of a level shifter 304 circuit that can be leveraged for modifying inputs/outputs to different voltages. As shown in FIG. 3B, the level shifter 304 may include a plurality the level shifters 304 circuits to create a bi-directional level shifter circuit that can control really fast edges so the inputs could read from a 5V incoming signal and convert to a 3.3V signal and the outputs could go in the opposite direction and receive a 3.3V command and output to a 5V command for a component. The plurality of level shifters 304 allow the ACS 100 to drive both low current and high current PWM outputs at varying voltages.

Figure 4:
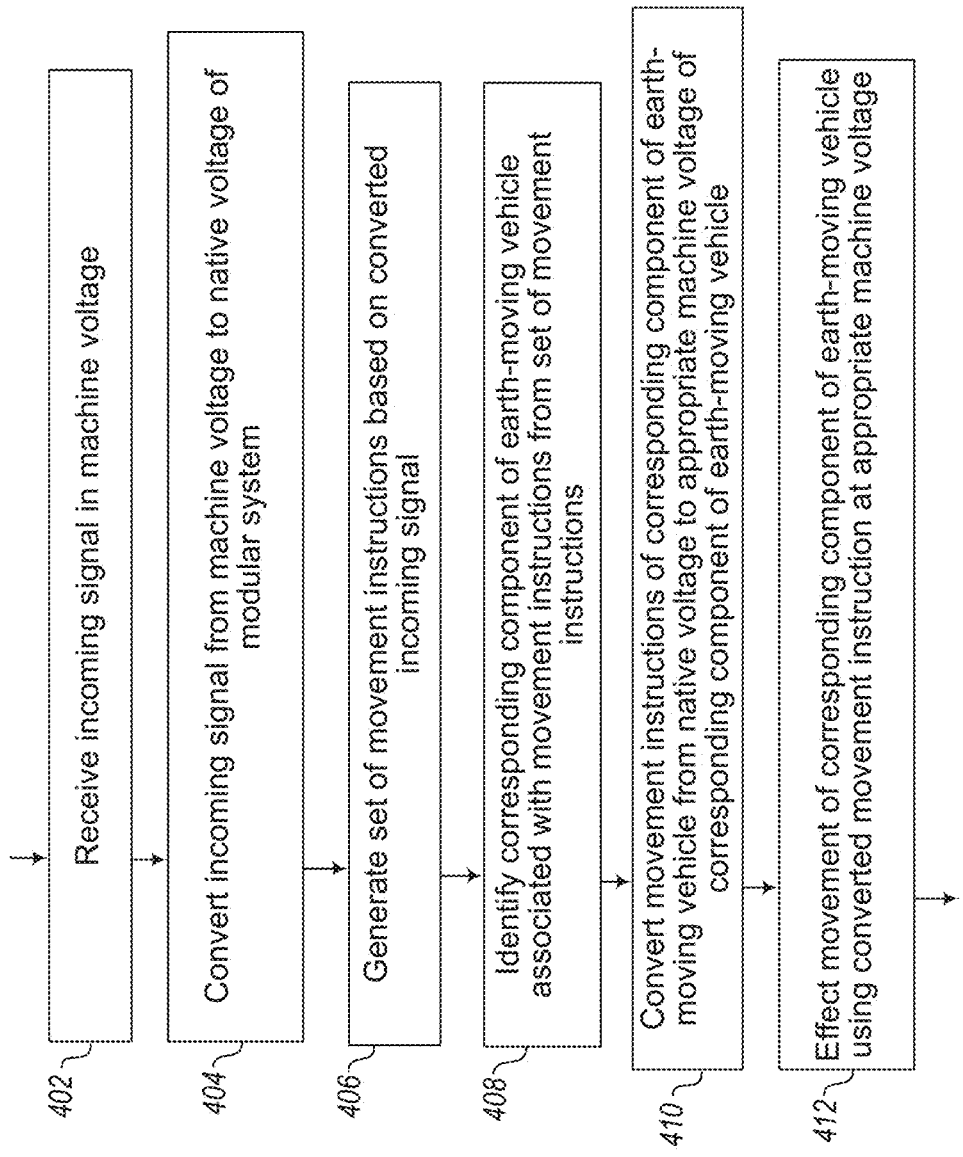
FIG. 4 illustrates a flowchart for an example embodiment of dynamically modifying an input and output using modular daughtercards.

FIG. 4 is an example flowchart 400 showing an example method for using modular daughtercards to adjust voltage inputs and outputs. As shown in FIG. 4, at block 402 the modular input daughtercard 108 via the machine interface 102 may receive from a component of a powered earth-moving construction and/or mining vehicle 170/175, an incoming signal in a machine voltage. For example, the machine voltages often run at 12V, 14V, or 24V although other machine voltages are also contemplated. At 404, the modular input daughtercard 108 may convert the incoming signals from the machine voltage to a native voltage of the modular system. The native voltage may be a low-power board voltage, such as a 3.3 V or 5V based on microcontroller configurations. In some implementations, the modular input daughtercard 108 may use various level shifter circuits as described elsewhere herein to convert the voltages as needed. At 406 the processor 112 of the ACS 100 of the modular system may generate a set of movement instructions based on the converted incoming signal. The movement instructions may be based on various positions and configurations of the components of the powered earth-moving construction and/or mining vehicle 170/175 as detected by various sensors and/or the incoming signal representing a movement command or change in a control, etc. For example, the incoming signal may be from a pedal or joystick of an earth-moving vehicle, representing a change in a position of a component. Using the incoming signal, other positional information, and/or machine learning information from the AI system 130, the processor 112 generates the set of movement instructions as commands that can be sent out to one or more components of the powered earth-moving construction and/or mining vehicle 170/175.

At 408, the processor 112 identifies a corresponding component of the earth-moving vehicle associated with the movement instruction from the set of movement instructions. In some implementations, the processor 112 may be able to perform dynamic voltage shifting based on determining the required voltage for the corresponding component. In further implementations, the processor 112 may identify the pathways to open to set the level of the voltage through the voltage shifters of the modular output daughtercard 110 to provide the appropriate voltage to the corresponding component.

At 410, the removable output daughtercard 110 converts the movement instructions of the corresponding component of the earth-moving vehicle from the native voltage, such as 3.3V or 5V on the board of the ACS 100, to an appropriate machine voltage, such as 12V or 24V, of the corresponding component of the powered earth-moving construction and/or mining vehicle 170/175. AT 412, the output at the appropriate machine voltage is then sent to effect a movement of the corresponding component of the powered earth-moving construction and/or mining vehicle 170/175 using the converted movement instructions at the appropriate machine voltage.

It should be understood that by using modular components, such as the input daughtercards 108 and output daughtercards 110, as well as any other daughtercard components, such as GPS, RTK, power trees, etc. the ACS 100 can be connected to a variety of different powered earth-moving construction and/or mining vehicles 170/175 and only connecting different modular daughtercards without having to change the layout of the ACS 100. This allows for ease of incorporation of the ACS 100 into existing powered earth-moving construction and/or mining vehicle 170/175 without laborious and expensive retrofitting for each type of powered earth-moving construction and/or mining vehicle 170/175. Additionally, as requirements change or improvements are made to the level shifter configurations of the daughtercards, the ACS 100 can remain the same for easier adaptation of the hardware improvements.

Non-exclusive example embodiments described herein are further described in the following clauses.

A01. A method for controlling autonomous operations of an earth-moving vehicle, comprising:
modifying, using a removable input daughtercard, an incoming signal from one or more components of the earth-moving vehicle;
generating, using a processor, a set of movement instructions based at least in part on the modified incoming signal;
modifying, using a removable output daughtercard, the set of movement instructions into a form to enable control of the one or more components of the earth-moving vehicle to effect a set of mechanical movements on the earth-moving vehicle; and
effecting, using a machine interface, the set of mechanical movements on the earth-moving vehicle corresponding to the set of movement instructions.

A02. A method for controlling autonomous operations of an earth-moving vehicle, comprising:
receiving, from a component of an earth-moving vehicle, an incoming signal in a machine voltage;
converting, using a removable input daughtercard of a modular system, the incoming signal from the machine voltage to a native voltage of the modular system;
generating, using a processor of the modular system, a set of movement instructions based on the converted incoming signal;
identifying, using the processor of the modular system, a corresponding component of the earth-moving vehicle associated with a movement instruction from the set of movement instructions;
converting, using a removable output daughtercard of the modular system, the movement instruction associated with the corresponding component from the native voltage of the modular system to a machine voltage used by the corresponding component of the earth-moving vehicle; and
effecting a movement of the corresponding component of the earth-moving vehicle using the converted movement instruction at the machine voltage.

A03. A method for controlling autonomous operations of an earth-moving vehicle, comprising:
receiving, from a component of an earth-moving vehicle, an incoming signal in a machine voltage;
converting, using at least one removable daughtercard of a modular system, the incoming signal from the machine voltage to a native voltage of the modular system;
generating, using a processor of the modular system, a set of movement instructions based on the converted incoming signal;
identifying, using the processor of the modular system, a corresponding component of the earth-moving vehicle associated with a movement instruction from the set of movement instructions;
converting, using at least one removable daughtercard of the modular system, the movement instruction associated with the corresponding component from the native voltage of the modular system to a machine voltage of an output signal used by the corresponding component of the earth-moving vehicle; and
effecting a movement of the corresponding component of the earth-moving vehicle using the converted movement instruction at the machine voltage.

A04. A method for controlling autonomous operations of an earth-moving vehicle, comprising:
modifying, using a removable input daughtercard, an incoming signal from one or more components of an earth-moving vehicle from a machine voltage to a native voltage;
generating, using a processor, a set of movement instructions based on the modified incoming signal and to determine an output voltage based on the set of movement instructions;
modifying, using a removable output daughter card, the set of movement instructions from the native voltage to the output voltage to enable control of the one or more components of the earth-moving vehicle to effect a set of mechanical movements on the earth-moving vehicle; and
effecting, using a machine interface, the set of mechanical movements on the earth-moving vehicle corresponding to the set of movement instructions.

A05. The method of any one of clauses A01-A04 wherein the processor is protected by an overvoltage fault protection system.

A06. The method of any one of clauses A01-A05 wherein the processor is protected by a reverse polarity protection system.

A07. The method of any one of clauses A01-A06 wherein the modular system includes one or more transient-protected power systems, the one or more transient-protected power systems being configured to provide output signals to corresponding components of the earth-moving vehicle based on the set of movement instructions.

A08. The method of clause A07 wherein the earth-moving vehicle further includes a set of safety shutoff switches configured to disable one or more of the transient-protected power systems based on threshold events.

A09. The method of any one of clauses A07-A08 wherein the transient-protected power system is capable of performing power conversion at full load with ultra-low thermal emission.

A10. The method of any one of clauses A01-A09 wherein the earth-moving vehicle further includes an expansion signal support system for supporting one or more of a digital drive, an analog drive, and a binary switch.

A11. The method of clause A10 wherein the expansion signal support system includes an amplifier.

A12. The method of clause A11 wherein the amplifier is configurable in real-time.

A13. The method of any one of clauses A10-A12 wherein the expansion signal support system further includes:
a plurality of driver circuits, comprising:
  an optocoupler that receives a shift register input;
  a configurable drive voltage configured to receive one or more of a native voltage from the earth-moving vehicle and a power supply of the modular system;
  an amplifier output connected to an NMOS amplifier;
  a MOSFET drain connected to a jumper to allow for selection of either the native voltage from the earth-moving vehicle or the power supply of the modular system; and
  voltage transient protection on the jumper;
two low-power microcontrollers with a signal interconnect between them; and
one or more status indicators to indicate board state.

A14. The method of any one of clauses A01-A13 wherein the removable input daughtercard is further configured to boost an incoming machine voltage level of the incoming signal to the modified incoming signal having a higher native voltage.

A15. The method of any one of clauses A01-A14 wherein the removable output daughtercard further includes an application-specific output drive amplifier.

A16. The method of any one of clauses A01-A15 wherein the earth-moving vehicle further includes one or more optically isolated pulse width modulation (PWM) input read amplifiers that receive the incoming signal from the one or more components of the earth-moving vehicle, the one or more optically isolated PWM input read amplifiers allowing the removable input daughtercard to read an incoming signal ranging from 3.3V to 20V and shift the incoming signal to a 0-5V range.

A17. The method of clause A16 wherein the earth-moving vehicle further includes a set of physical bypass options that allow the one or more optically isolated PWM input read amplifiers to be bypassed and the incoming signal to be directly routed to the processor.

A18. The method of clause A17 wherein the set of physical bypass options are non-stuffed resistors.

A19. The method of any one of clauses A01-A18 wherein the processor is further configured to receive machine learning instructions that are used for generating the set of movement instructions.

A20. The method of any one of clauses A01-A19 wherein the removable input daughtercard and the removable output daughtercard are part of a single physical card.

A21. The method of any one of clauses A01-A20 further comprising:
determining whether a shutoff switch should be actuated based on a threshold event; and
causing a transient-protected power system to be disabled based on the threshold event being met.

A22. The method of any one of clauses A01-A21 wherein generating the set of movement instructions based on the converted incoming signal further includes:
receiving machine learning instructions; and
generating, using the processor of the modular system, the set of movement instructions using the machine learning instructions and the converted incoming signal.

A23. A method for controlling autonomous operations of an earth-moving vehicle, comprising:
receiving, from a component of an earth-moving vehicle, an incoming signal in a machine voltage;
converting, using a removable input daughtercard of a modular system, the incoming signal from the machine voltage to a native voltage of the modular system;
generating, using a processor of the modular system, a set of movement instructions based on the converted incoming signal;
identifying, using the processor of the modular system, a corresponding component of the earth-moving vehicle associated with a movement instruction from the set of movement instructions; and
effecting a movement of the corresponding component of the earth-moving vehicle based on the movement instruction.

A24. A method for controlling autonomous operations of an earth-moving vehicle, comprising:
receiving, by one or more hardware processors, a detected position of a component of an earth-moving vehicle;
generating, by the one or more hardware processors, a movement instruction for the component of the earth-moving vehicle based on the detected position;
converting, by the one or more hardware processors and using a removable output daughtercard, the movement instruction from a native voltage associated with the one or more hardware processors to a machine voltage associated with the component of the earth-moving vehicle; and
sending, by the one or more hardware processors, the converted movement instruction to the component of the earth-moving vehicle to effect a movement of the component of the earth-moving vehicle.

A25. A method for controlling autonomous operations of an earth-moving vehicle, comprising:
generating, by a configured processor, a set of movement instructions based on an incoming signal from a first component of an earth-moving vehicle and identify a corresponding second component of the earth-moving vehicle associated with a movement instruction from the set of movement instructions;
modifying, by a removable output daughter card, the movement instruction associated with the second component from a native voltage associated with the processor to a machine voltage used by the second component of the earth-moving vehicle; and effecting, by a machine interface, a movement of the second component of the earth-moving vehicle using the modified movement instruction at the machine voltage.

A26. The method of any one of clauses A23-A25 wherein the machine voltage is a higher voltage than the native voltage and the removable input daughtercard converts the machine voltage to the native voltage by lowering the voltage.

A27. The method of any one of clauses A23-A26 wherein the removable input daughtercard is a level shifter circuit.

A28. The method of any one of clauses A23-A27 wherein the removable input daughtercard is a bi-directional level shifter circuit, and wherein the machine voltage is a 5V incoming signal and the native voltage is a 3.3V output signal.

A29. The method of any one of clauses A23-A28 wherein the incoming signal represents a change in a position of the corresponding component of the earth-moving vehicle.

A30. The method of clause A29 wherein the change in the position of the corresponding component of the earth-moving vehicle is a change in a position of a joystick that controls the corresponding component of the earth-moving vehicle.

A31. The method of any one of clauses A29-A30 wherein the change in the position of the corresponding component of the earth-moving vehicle is detected by a sensor that measures a position of the corresponding component of the earth-moving vehicle.

A32. The method of any one of clauses A23-A31 wherein the effecting of the movement of the corresponding component of the earth-moving vehicle based on the movement instruction further comprises shifting a voltage of the movement instruction from the native voltage to the machine voltage, and using the shifted voltage as an outgoing signal for the effecting of the movement.

A33. The method of any one of clauses A23-A32 wherein the generating of the set of movement instructions is further based on generated machine learning instructions.

A34. The method of any one of clauses A23-A33 further comprising providing, by one or more transient-protected power systems, output signals to corresponding components of the earth-moving vehicle based on the set of movement instructions.

A35. The method of any one of clauses A23-A34 wherein the removable output daughtercard includes an application-specific output drive amplifier.

A36. The method of any one of clauses A23-A35 wherein the removable output daughtercard is a level shifter circuit.

A37. The method of any one of clauses A23-A36 wherein the removable output daughtercard is a bi-directional level shifter circuit, and wherein the native voltage is a 3.3V incoming signal and the machine voltage is a 5V output signal.

A38. The method of clause A37 wherein the removable output daughtercard includes a bypass circuit that allows signals to be passed from the processor to the corresponding component of the earth-moving vehicle without modifying the signals.

A39. The method of any one of clauses A23-A38 wherein the removable output daughtercard uses dynamic level shifting.

A40. The method of any one of clauses A23-A39 further comprising receiving machine learning instructions and using them for generating the set of movement instructions.

A41. The method of any one of clauses A23-A40 wherein the generated movement instruction is a 3.3V signal, wherein the machine voltage is a 5V signal, and wherein the stored contents include software instructions that, when executed by the one or more hardware processors, cause the one or more hardware processors to perform further automated operations including causing the removable output daughtercard to convert the generated movement instruction from the 3.3V signal to the 5V signal using one or more level shifters.

A42. The method of clause A41 wherein the removable output daughtercard uses dynamic level shifting.

A43. A computer-implemented method comprising multiple steps to perform automated operations that implement described techniques substantially as disclosed herein.

B01. A non-transitory computer-readable medium having stored executable software instructions and/or other stored contents that cause one or more computing systems to perform automated operations that implement the method of any of clauses A01-A43.

C02. One or more computing systems comprising one or more hardware processors and one or more memories with stored instructions that, when executed by at least one of the one or more hardware processors, cause the one or more computing systems to perform automated operations that implement described techniques substantially as disclosed herein.

D01. A computer program adapted to perform the method of any of clauses A01-A43 when the computer program is run on a computer.

E01. An earth-moving vehicle having components adapted to perform the method of any of clauses A01-A43.

E02. An earth-moving vehicle having components as recited in any of clauses A01-A43.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A method comprising:
    receiving, from a component of an earth-moving vehicle, an incoming signal in a machine voltage;
    converting, using a removable input daughtercard of a modular system, the incoming signal from the machine voltage to a native voltage of the modular system;
    generating, using a processor of the modular system, a set of movement instructions based on the converted incoming signal;
    identifying, using the processor of the modular system, a corresponding component of the earth-moving vehicle associated with a movement instruction from the set of movement instructions; and
    effecting a movement of the corresponding component of the earth-moving vehicle based on the movement instruction.

2. The method of claim 1 wherein the machine voltage is a higher voltage than the native voltage and the removable input daughtercard converts the machine voltage to the native voltage by lowering the voltage.

3. The method of claim 1 wherein the removable input daughtercard is a level shifter circuit.

4. The method of claim 1 wherein the removable input daughtercard is a bi-directional level shifter circuit, and wherein the machine voltage is a 5V incoming signal and the native voltage is a 3.3V output signal.

5. The method of claim 1 wherein the incoming signal represents a change in a position of the corresponding component of the earth-moving vehicle.

6. The method of claim 5 wherein the change in the position of the corresponding component of the earth-moving vehicle is a change in a position of a joystick that controls the corresponding component of the earth-moving vehicle.

7. The method of claim 5 wherein the change in the position of the corresponding component of the earth-moving vehicle is detected by a sensor that measures a position of the corresponding component of the earth-moving vehicle.

8. The method of claim 1 wherein the effecting of the movement of the corresponding component of the earth-moving vehicle based on the movement instruction further comprises shifting a voltage of the movement instruction from the native voltage to the machine voltage, and using the shifted voltage as an outgoing signal for the effecting of the movement.

9. The method of claim 1 wherein the generating of the set of movement instructions is further based on generated machine learning instructions.

10. A modular system for controlling an earth-moving vehicle comprising:
    a processor that is configured to generate a set of movement instructions based on an incoming signal from a first component of an earth-moving vehicle and identify a corresponding second component of the earth-moving vehicle associated with a movement instruction from the set of movement instructions;
    a removable output daughter card that is configured to modify the movement instruction associated with the second component from a native voltage associated with the processor to a machine voltage used by the second component of the earth-moving vehicle; and
    a machine interface that is configured to effect a movement of the second component of the earth-moving vehicle using the modified movement instruction at the machine voltage.

11. The modular system of claim 10 further comprising one or more transient-protected power systems, the one or more transient-protected power systems being configured to provide output signals to corresponding components of the earth-moving vehicle based on the set of movement instructions.

12. The modular system of claim 10 wherein the removable output daughtercard includes an application-specific output drive amplifier.

13. The modular system of claim 10 wherein the removable output daughtercard is a level shifter circuit.

14. The modular system of claim 10 wherein the removable output daughtercard is a bi-directional level shifter circuit, and wherein the native voltage is a 3.3V incoming signal and the machine voltage is a 5V output signal.

15. The modular system of claim 14 wherein the removable output daughtercard includes a bypass circuit that allows signals to be passed from the processor to the corresponding component of the earth-moving vehicle without modifying the signals.

16. The modular system of claim 10 wherein the removable output daughtercard uses dynamic level shifting.

17. The modular system of claim 10 wherein the processor is further configured to receive machine learning instructions that are used for generating the set of movement instructions.

18. A non-transitory computer-readable medium having stored contents that cause one or more hardware processors to perform automated operations including at least:
    receiving, by the one or more hardware processors, a detected position of a component of an earth-moving vehicle;
    generating, by the one or more hardware processors, a movement instruction for the component of the earth-moving vehicle based on the detected position;
    converting, by the one or more hardware processors and using a removable output daughtercard, the movement instruction from a native voltage associated with the one or more hardware processors to a machine voltage associated with the component of the earth-moving vehicle; and
    sending, by the one or more hardware processors, the converted movement instruction to the component of the earth-moving vehicle to effect a movement of the component of the earth-moving vehicle.

19. The non-transitory computer-readable medium of claim 18 wherein the generated movement instruction is a 3.3V signal, wherein the machine voltage is a 5V signal, and wherein the stored contents include software instructions that, when executed by the one or more hardware processors, cause the one or more hardware processors to perform further automated operations including causing the removable output daughtercard to convert the generated movement instruction from the 3.3V signal to the 5V signal using one or more level shifters.

20. The non-transitory computer-readable medium of claim 19 wherein the removable output daughtercard uses dynamic level shifting.

\* \* \* \* \*